United States Patent [19]
Chang et al.

[11] Patent Number: 5,202,103
[45] Date of Patent: Apr. 13, 1993

[54] REMOVAL OF SULFUR DIOXIDE FROM GAS STREAMS

[75] Inventors: John C. Chang, Cary, N.C.; Leo E. Hakka; Veronique Roy, both of Montreal-East, Canada

[73] Assignee: Union Carbide Chemicals & Plastics Technology Corporation, Danbury, Conn.

[21] Appl. No.: 811,813

[22] Filed: Dec. 20, 1991

[51] Int. Cl.$^5$ .............................................. C01B 17/00
[52] U.S. Cl. .............................. 423/242.7; 423/243.08
[58] Field of Search ................. 423/243, 244 A, 244 R

[56] References Cited

U.S. PATENT DOCUMENTS

| | | | |
|---|---|---|---|
| 3,632,306 | 1/1972 | Villiers-Fisher et al. | 23/2 SQ |
| 3,637,345 | 1/1972 | Leder | 423/243 |
| 3,873,673 | 3/1975 | Teague et al. | 423/243 |
| 3,883,639 | 5/1975 | Cronkright, Jr. et al. | 423/242 |
| 4,388,281 | 6/1983 | Holter et al. | 423/243 |
| 4,409,192 | 10/1983 | Lichtner et al. | 423/242 |
| 4,423,018 | 12/1983 | Lester, Jr. et al. | 423/243 |
| 4,612,175 | 9/1986 | Harkness et al. | 423/235 |

OTHER PUBLICATIONS

Y. Josephe Lee et al., Oxidative Degradation of Organic Acids Conjugated with Sulfite Oxidation in Flue Gas Desulfurization. EPA/600/S2.88/018, Apr. 1988.

Gary T. Rochelle et al., The Effect of Additives on Mass Transfer in CaCO3 or CaO Slurry Scrubbing of SO from Wast Gases. Ind. Eng. Chem. Fundam. vol. 16, No. 1, 1977.

*Primary Examiner*—Gregory A. Heller
*Attorney, Agent, or Firm*—W. K. Volles

[57] ABSTRACT

Processes are provided for the removal of sulfur dioxide from gas streams using aqueous lime or limestone slurries containing an additive comprising an amine. The amines have an available alkalinity of at least 0.5 meq/gram at a pH between 3.0 and 5.5. The amines are highly soluble in the slurry and can have a low volatility, thereby reducing amine losses with the gas product. Furthermore, amines which are absorbed on the calcium sulfate or calcium sulfite by-products can be recovered by water-washing with a water make-up stream.

20 Claims, 1 Drawing Sheet

REMOVAL OF SULFUR DIOXIDE FROM GAS STREAMS

FIELD OF THE INVENTION

The present invention relates to the removal of sulfur dioxide from gas streams by absorption using a lime or limestone slurry containing additives which comprise amines.

BACKGROUND OF THE INVENTION

Sulfur dioxide is a component in many commercial effluents such as flue gas produced from burning sulfur-containing hydrocarbons such as natural gas, oil and coal. Flue gases are typically emitted from coal-fired electric power plants, boilers and furnaces. Sulfur dioxide is also a component of the gaseous effluents from sulfuric acid plants, sulfur plants, smelters, as well as other chemical and petroleum processes. Sulfur dioxide is an undesirable pollutant in the atmosphere. Accordingly, a variety of processes have been proposed for the removal of sulfur dioxide from gas streams.

Wet flue gas desulfurization processes using lime or limestone are among the most widely used processes to absorb sulfur dioxide from gas streams. In these wet flue gas desulfurization processes, the gas stream is contacted with an aqueous slurry of lime or limestone. The sulfur dioxide in the gas reacts with the slurry to form calcium sulfite or calcium sulfate, or both. These compounds are collected and removed from the processes and the purified gas is discharged to the atmosphere.

Improvements have been made to the basic processes in order to enhance the rate of absorption of sulfur dioxide by the slurry. In general, the improvements have been accomplished by the incorporation of chemical additives to the slurry. Several of the improved lime/limestone slurry absorption processes are described below.

U.S Pat. No. 3,632,306, issued to Villiers-Fischer, et al., discloses a process wherein waste gases containing sulfur dioxide are scrubbed with an aqueous slurry containing solid reactant particles of an oxide or carbonate of calcium, magnesium or barium, together with an additive containing an acidic radical which solubilizes the calcium, magnesium or barium ion so that the slurry absorbs sulfur dioxide from the gas. At col. 3, lines 25 to 27, the patentees disclose that the acid radical consists of an acid intermediate in strength between carbonic acid and sulfuric acid, or a comparable acid salt.

U.S. Pat. No. 3,883,639, issued to Cronkright, Jr., et al., discloses a process which involves contacting a waste gas containing an oxide of sulfur with an aqueous medium having a PH below 7.1 in an autoregenerative cyclic process using limestone in combination with carbon dioxide and a soluble sulfate of a cation, such as potassium, lithium, sodium, magnesium or ammonium or mixtures of these compounds, to remove the oxides of sulfur.

Rochelle and King, in an article captioned *The Effect of Additives on Mass Transfer in CaCO3 or CaO Slurry Scrubbing of SO2 From Waste Gases*, Ind. Eng. Chem., Fundam., Volume 16, No. 1, 1977, 67–75, disclose that both alkali additives and organic acid additives can be used in lime or limestone slurries in order to improve the sulfur dioxide mass transfer. The authors specifically disclose, on page 71, that the most important potential soluble alkali additives are magnesium oxide, sodium carbonate and ammonia. In addition, in Table III on page 72, acetic acid, benzoic acid, glycolic acid, adipic acid, isophthalic acid and sulfopropionic acid are specifically disclosed as organic acid additives.

U.S. Pat. No. 4,409,192, issued to Lichtner, et al., discloses a method of removing sulfur dioxide from flue gases derived from furnaces burning high sulfur content fuels. The method comprises spraying flue gases with an aqueous medium containing (i) a material either dissolved or slurried therein, which material reacts with the sulfur dioxide in the flue gases to produce calcium sulfate and calcium sulfite, and (ii) a composition comprising a substantially linear water-soluble sulfonated polystyrene and an organophosphonic acid derivative having the structural formula $(X)_2N-R-N(X)_2$, where R is a lower alkyl of from 1 to 7 carbon atoms, X is hydrogen or the group $-CH_2PO_3M_2$, where M is a water-soluble cation, the compound being further characterized in that at least one but preferably all X's are $-CH_2PO_3M_2$.

U.S. Pat. No. 4,423,018, issued to Lester, Jr., et al., discloses a by-product stream from the production of adipic acid from cyclohexane containing glutaric acid, succinic acid and adipic acid, which is employed as a buffer in lime or limestone flue gas scrubbing for the removal of sulfur dioxide from combustion gases. The additive disclosed in U.S. Pat. No. 4,423,018 is often referred to as a dibasic acid, i.e., DBA, and is widely used in commercial processes.

Lee and Rochelle, in an article captioned *Oxidative Degradation of Organic Acids Conjugated with Sulfite Oxidation in Flue Gas Desulfurization*, United States Environmental Protection Agency, Research and Development Project Summary, April, 1988, relates to the oxidative degradation of the organic acid additives often used in flue gas desulfurization systems. On page 1, the authors disclose:

> In addition to the expected loss of organic acid additive by entrainment of solution in waste solids, loss by chemical degredation and coprecipitation is also observed. Chemical degradation which is conjugated with sulfate oxidation is the most important mechanism of buffer loss under forced oxidation conditions.

Thus, oxidative degradation is one of the problems associated with the use of organic acid additives in lime/limestone slurry processes.

Improvements have also been made to enhance the absorption of nitrous oxides which may be present in sulfur dioxide-containing gas streams.

For example, U.S. Pat. No. 4,612,175, issued to Harkness, et al., discloses a method of simultaneously removing $SO_2$ and NO from oxygen-containing flue gases resulting from the combustion of carbonaceous material by contacting the flue gas with an aqueous scrubber solution containing an aqueous sulfur dioxide sorbent and an active metal chelating agent which promotes a reaction between dissolved $SO_2$ and dissolved NO to form hydroxylamine N-sulfonates. The hydroxylamine sulfonates are then separated from the scrubber solution which is recycled. At column 2, lines 13–18, the patentees disclose that the active metal chelate is prepared by mixing a soluble metal salt and a chelating agent in an oxygen-free environment for a period of time sufficient for all the possible coordination sites on the chelating agent to coordinate with the metal ion. At column 4, lines 6 to 21, the patentees disclose:

Suitable chelating agents are the polyamines such as hexamethylenetetraamine (HMTA), ethylenediamine, diethylenetriamine, triethylenetetraamine, polyaminopoly-carboxylic acids, such as ethylenediamine-tetraacetic acid (EDTA) and N-(2-hydroxyethyl)ethylenediamine-N, N', N'-triacetic acid (HEEDTA) and polycarboxylic acids such as citric acid. Suitable metal ions include Fe(II), Zn(II), Ni(II) and Co(II) and Al(III). The quantity of active metal chelate in the solution may range from about 0.01 to 0.7 gm moles per liter, preferably the range is 0.06 to 0.075, about 0.066 gm moles/liter. The scrubber solution typically may contain more than one chelating agent in the concentration described above since it has been found that the addition of a second agent may enhance removal of NO from the flue gas to greater than 95%.

In addition to the oxidative degradation problem, other problems which occur with the use of additives include losses due to high volatility of the additive and low water solubility of the additive, which can limit the amount of additive that can be incorporated in the slurry.

Accordingly, although the processes described above have been useful for removing sulfur dioxide from gas streams, new lime/limestone absorption processes are desired which utilize additives that are less prone to oxidative degradation and have lower volatility and increased solubility.

SUMMARY OF THE INVENTION

By the present invention, processes are provided for the removal of sulfur dioxide by absorption with an aqueous lime or limestone absorbent containing an additive comprising an amine. The amines used in the processes of the present invention are often characterized as having a low oxidative degradation tendency, low losses due to volatility, and high water solubility.

In one aspect of the invention, there is provided a process for removing sulfur dioxide from a gas stream. The process comprises the steps of (a) contacting a feed gas with an aqueous slurry comprising: (i) an absorbent selected from lime, limestone and mixtures thereof; and (ii) an additive comprising an amine having an available alkalinity of at least about 0.5 meq/gram between a pH of 3.0 and 5.5, at conditions effective to absorb sulfur dioxide from the feed gas; (b) withdrawing a product gas at least partially depleted in sulfur dioxide; and (c) withdrawing a spent slurry comprising at least one of calcium sulfate or calcium sulfite.

In another aspect of the invention there is provided a method for enhancing the absorption rate of sulfur dioxide in an absorption process which uses an aqueous lime/limestone absorbent for the removal of sulfur dioxide from a gas stream. The method comprises adding an effective amount of an additive comprising an amine having an available alkalinity of at least about 0.5 meq/gram between a pH of 3.0 and 5.5 to enhance the absorption rate of sulfur dioxide.

DETAILED DESCRIPTION OF THE INVENTION

Figure 1:
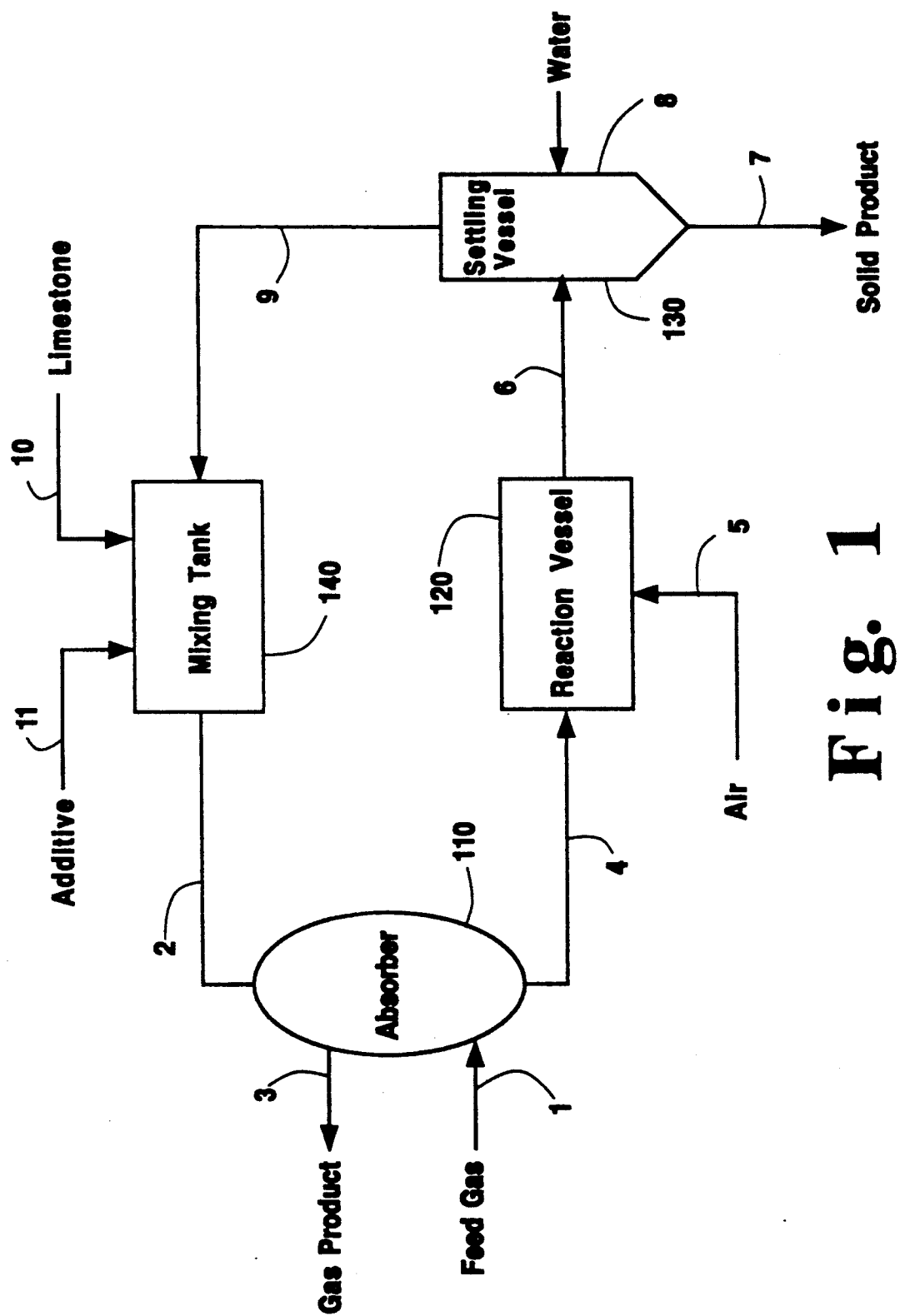
FIG. 1 illustrates a process for removing sulfur dioxide from a gas stream in accordance with the present invention.

The absorbent of the present invention is an aqueous absorbent which comprises lime, limestone or mixtures thereof. Both lime and limestone are readily commercially available. Lime is generally more reactive than limestone and, hence, less contact time is typically required to remove a given amount of sulfur dioxide. However, the handling of lime is more difficult because lime rapidly absorbs water which can result in a substantial heat release when the lime is exposed to moisture. Hydrated lime can be used instead of dry lime in order to improve its handling characteristics. Limestone is often preferred because it is easy to handle and costs less than lime. Preferred limestones are those which have a high calcium content, i.e., at least about 95 weight percent calcium carbonate. Other preferred limestones are those which contain calcium carbonate and magnesium oxides, e.g., up to about 20 weight percent magnesium oxides. Typically, the limestones contain impurities such as silica, which do not adversely affect the absorption of sulfur dioxide when present in low concentrations.

The additive of the present invention comprises any amine or mixture of amines having an available alkalinity of at least about 0.5 milliequivalents per gram of amine ("meq/gram") between a pH of 3.0 and 5.5. The term "available alkalinity", as used herein, means the amount of active sites on the amine which are available to be protonated between a pH of 3.0 and 5.5. Preferably, the available alkalinity is at least about 2.0 meq/gram, more preferably at least about 3.0 meq/gram and most preferably, at least about 4.0 meq/gram. Often, the available alkalinity for the amines used in the present invention does not exceed about 10.0, although higher values are also suitable.

It is not essential that the amine and water be miscible under any of the conditions of the processes, nor is it essential that the amine be liquid under any conditions of the processes. Frequently, the solubility of the amine in water is at least about 100 ppmw. Preferably, the solubility of the amine in water is from about 1000 ppmw to about 5000 ppmw. More preferably, the amine is miscible with water under the conditions of the process.

Generally, any amine having the desired available alkalinity can be employed in the processes of the present invention. Suitable amines include monoamines, such as N,N-dimethylaniline, 4-(2-hydroxyethyl)-piperazinane-2, xylidines and the like, polyamines and mixtures of any of these amines. As used herein, the term "polyamines" includes any amine having more than one amine group. Preferably, the amines comprise at least one alkyl, hydroxy-alkyl, cycloalkyl, aryl or alkaryl hydrocarbon group. More preferably, each of such hydrocarbon groups comprise from 1 to about 10 carbon atoms. In addition, heterocyclic amines can be employed.

Preferably, the amines comprise molecules that consist essentially of the elements carbon, nitrogen and one or more of hydrogen, sulfur, oxygen, chlorine, fluorine, bromine and iodine. Furthermore, it is preferred that the amines are substantially free of metals, although minor amounts may be present from manufacturing, handling and storage of the amines. The term "substantially free" as used herein means less than 1% by weight of the amine. Preferably, the amines have an essential absence of metals, i.e., less than 100 ppmw of the amine.

Preferably, the amine is a polyamine having at least one amine group with a pKa of between about 3.0 and 5.5. More preferably, the amine is a polyamine having at least one other amine group with a pKa of at least about 6.0. Polyamines which comprise at least one amine group with a pKa greater than about 6.0, are in a partial salt form at a pH of about 5.5 and lower. The formation of partial salts is effective to reduce the volatility of the amine and reduce losses with the gas product. The non-protonated amine should be capable of conversion to ammonium salts in the presence of sulfur dioxide. As is generally the case, the protonation of the first amine group, i.e., higher pKa, will occur under more basic conditions than that when the second amine group is protonated, e.g., lower pKa. Because the pKa of an amine varies with temperature, for the sake of uniformity, all PKa values referred to herein are made at 25° C. in an aqueous medium.

Specifically preferred amines for use in the process of the present invention include: monoamines, such as N,N-dimethylaniline; diamines, such as N,N',N'-(trimethyl)-N-(2-hydroxyethyl)-ethylenediamine, N,N,N',N'-tetramethyl-ethylenediamine, N,N,N',N'-tetramethyl-diaminomethane, N,N,N',N'-tetrakis-(2-hydroxyethyl)-ethylenediamine, N,N'-dimethylpiperazine, N,N,N',N'-tetrakis-(2-hydroxyethyl)-1,3-diaminopropane, N',N'-dimethyl-N,N-bis(2-hydroxyethyl)-ethylenediamine, N,N'-bis(2-hydroxyethyl)-piperazine, N-methyl-piperazine, piperazine, N-(2-hydroxyethyl)-piperazine, aminoethyl-piperazine, aminoethyl-ethanolamine, triamines; such as diethylenetriamine; tetramines, such as triethylenetetramine; pentamines; and mixtures thereof.

Also preferred for use as amines in accordance with the present invention are the by-product amines obtained from the production of commodity amines, such as, for example, monoethanolamine, diethanolamine, methyldiethanolamine, ethyleneamines, hydroxyethyl-piperazine, and piperazine. Often these by-products contain several different amines, which are not undesirable provided that the by-product has the desired available alkalinity. Furthermore, these by-products can often be obtained at a relatively low cost from commercial manufacturers of commodity amines.

Preferably, the amine used in the process of the present invention is present in the slurry in an amount effective to provide enhanced absorption of sulfur dioxide. As used herein, the term "enhanced absorption" means an improvement in the absorption rate of sulfur dioxide as compared to an aqueous lime or limestone slurry which does not contain an additive. Generally, the effective amount of amines having a high available alkalinity will be less than for amines having a lower availability alkalinity. Typically, the slurry will comprise less than about 5 weight percent of the amine based on the total weight of the slurry. Preferably, the slurry will comprise from about 100 to 5000 ppmw of the amine, based on the total weight of the slurry, and more preferably, from about 300 to 1000 ppmw.

In addition to the amine-containing additive of the present invention, the slurry may also contain other additives including other rate enhancement additives, such as, for example, magnesium oxide, sodium carbonate, adipic acid and formic acid, as well as anti-oxidants such as, for example, thiosulfate, and corrosion inhibitors.

In the processes of the present invention, the aqueous lime or limestone slurry containing the amine is contacted with the feed gas containing sulfur dioxide in an absorption zone. Any convenient gas-liquid contacting apparatus may be used. Illustrative contacting devices include countercurrent absorption columns, countercurrent or concurrent spray columns such as, for example, Waterloo scrubbers and open spray towers, venturi scrubbers, and thin film contactors.

The amount of absorbent employed per unit volume of gas, and the contact time, are at least sufficient to effect the removal of the desired amount of the sulfur dioxide. For instance, in some cases it may be desired to remove only a portion of the sulfur dioxide. In other cases, it may be desired to remove substantially all the sulfur dioxide from the gas stream, i.e., to leave less than 500 ppmv, preferably less than 200 ppmv, even less than 100 ppmv, sulfur dioxide. The processes are applicable to any sulfur dioxide-containing gas stream, e.g., up to 20 or 50 volume percent sulfur dioxide, but is particularly useful for the purification of flue gas streams which typically contain about 700 to about 10,000 ppmv sulfur dioxide, often about 1000 to 3000 ppmv sulfur dioxide.

Typically, the contacting of the slurry with the sulfur dioxide-containing gas stream is effected within a temperature range of up to about 80° C., often about 10 to about 80° C., preferably about 30° to about 70° C. In addition, it is preferred that the temperature is sufficient to provide from about 70 to about 90% water saturation of the feed gas. Furthermore, it is preferred that the contacting is effected to obtain a loading of sulfur dioxide of at least 0.8 gram of sulfur dioxide per gram of calcium in the slurry, preferably about 1.4 grams of sulfur dioxide per gram of calcium in the slurry.

The pH of the slurry is generally less than 6.0, preferably from about 3.0 to 5.8, and most preferably from about 4.5 to 5.5 during the absorption. At the inlet of the absorption zone, the slurry typically has a pH close to the upper end of these ranges. As sulfur dioxide is absorbed, the slurry tends to become more acidic and the pH moves towards the lower end of the ranges.

The time of contact between the gas and slurry will depend upon the intimacy of contact between the phases and the rate of transfer of the sulfur dioxide into the slurry. For spray-type scrubbers, the contact time may be less than 10 seconds. With absorption columns, the contact time may be 30 seconds or more.

The pressure may vary widely, e.g., from subatmospheric to superatmospheric pressures. Since higher pressures increase the partial pressure of a given mole fraction of sulfur dioxide, they are favored from a thermodynamic standpoint. However, in many instances the gas to be treated is at a pressure slightly higher or lower than the ambient pressure and raising the pressure is economically undesirable. Thus the processes of the present invention are typically operated at near ambient pressure, e.g., within 0.5 atmosphere, preferably within about 0.1 atmosphere, of the ambient pressure.

The processes of the present invention are hereafter described with reference to the drawing which is provided for illustrative purposes and is not intended to limit the scope of the claims.

Referring to FIG. 1, a feed gas containing sulfur dioxide is passed to absorber 110 by line 1 wherein it is contacted with an aqueous slurry comprising limestone and about 1000 ppmw of diethylenetriamine (the "additive"). The slurry is introduced to the absorber by line 2. The absorption conditions in the absorber include a temperature of about 50° C. and a pressure slightly above atmospheric. A gas product which is substantially depleted in sulfur dioxide is removed from absorber 110 by line 3. In addition to being depleted in sulfur dioxide, the gas product comprises water vapor, i.e., has humidity. Typically, the gas product is water saturated due to contact with the aqueous slurry. The water content of the gas product may be higher or lower than the water content of the feed gas depending on the conditions of the feed gas.

Spent slurry containing calcium sulfate, calcium sulfite and residual limestone is withdrawn from absorber 110 by line 4 and passed to reaction vessel 120 wherein it is contacted with air (or oxygen) from stream 5 in order to promote oxidation of calcium sulfite to calcium sulfate. Reaction vessels such as reaction vessel 120 are optional and need not be included in the process. Furthermore, air can be added to the absorber during the absorption step to promote the oxidation instead of using a separate reaction vessel.

A treated spent slurry is withdrawn from reaction vessel 120 by line 6 and passed to a settling zone comprising settling vessel 130 wherein the solid product, i.e., calcium sulfate and calcium sulfite, is separated from the liquid, i.e., water and amine by filtration. The separation zone typically contains suitable equipment to perform the separation either by filtration, centrifugation or both. The spent slurry stream is retained in the settling vessel for a residence time of sufficient duration to substantially complete the separation of the solids from the liquid.

Since some of the water as well as some of the additive present in the process is typically lost with the gas product and the solid product, a water make-up stream is often introduced to the process. In accordance with the present invention, at least a portion of the make-up water is preferably used to wash the solid product to desorb the additive. In this way, it is possible to recover at least a portion of the additive that would otherwise be lost with the solid product. Preferably, the rate of addition of make-up water contacted with the solid product does not exceed the sum of the rate of water removal with the solid product plus the gas product. As shown in FIG. 1, the water make-up stream is introduced to the settling vessel by line 8 wherein it is contacted with solid product to desorb amine. The washed solid product is then withdrawn by line 7. In some instances, it may be desirable to also introduce a portion of the make-up water somewhere else in the process, e.g., in the mixing tank.

A recycle stream containing water, i e., process water and make-up water, and the additive is withdrawn from settling vessel 130 by line 9 and passed to mixing tank 140 wherein it is mixed with make-up limestone, which is introduced by line 10, and with make-up additive, which is introduced by line 11. A mixing tank effluent comprising water, limestone and additive, which is the aqueous slurry, is withdrawn from mixing tank 140 by line 2 and passed to scrubber 10 as hereinbefore described.

EXAMPLE

The following example is provided for illustrative purposes and is not intended to limit the scope of the claims which follow:

A test was performed in order to evaluate the effectiveness of various amines as additives in the processes of the present invention. The evaluation was based on the amount of sulfur dioxide removed from a gas stream when passed over a solution containing the particular amine and water. The results of evaluation were determined by calculating a "% Efficiency over Water", where $$\% \text{ Efficiency over Water} = \frac{\text{volume of } SO_2 \text{ removed by water containing 3000 ppmw amine } (x)}{\text{volume of } SO_2 \text{ removed by water containing no amine}} \cdot 100$$

The test was performed as follows:

A water solution containing the amine and a gas stream containing sulfur dioxide were continuously passed through a contactor where a portion of the sulfur dioxide transferred from the gas phase to the liquid phase. The solution was introduced to the contactor at a rate of about 15 milliliters ("ml") per minute. The gas stream was introduced to the contactor at a rate of about 3 liters per minute. The volume of the contactor was about 1600 ml and the volume of water solution in the contactor was about 800 ml. Each stream was independently, but continuously, stirred to ensure constant mass transfer and uniform experimental conditions for each amine tested. The solution contained 3000 ppmw of the amine to be tested while the gas stream entering the contactor contained 5000 ppmw of sulfur dioxide. A pure water solution and a solution containing water and 3000 ppmw of adipic acid were tested and the results were used as a comparison. All of the tests were performed at ambient temperature and pressure.

The results from the test are shown in Table 1.

TABLE 1

| Amine | % Efficiency Over Water | Available Alkalinity from pH 3.0–5.5 meq/gram |
| --- | --- | --- |
| Water | 100 | * |
| Adipic Acid | 205 | 10.92 |
| N-(2-hydroxyethyl)-piperazine | 187 | 6.34 |
| N-methylpiperazine | 161 | 4.50 |
| N,N'-dimethylpiperazine | 195 | 7.80 |
| N,N'-bis(2-hydroxyethyl) piperazine | 165 | 5.16 |
| N,N,N',N'-tetramethyl ethylenediamine | 134 | 2.36 |
| N,N,N'N'-tetrakis-(2-hydroxyethyl)-ethylenediamine | 162 | 3.75 |
| 1,3-bis(dimethyl amino)-2-propanol | 108 | 0.36 |
| 3-dimethylamino-propylamine | 117 | 0.50 |
| triethanolamine | 101 | 0.17 |
| diethylethanolamine | 96 | 0.10 |
| diethylenetriamine | 197 | 8.76 |
| dimethylethanolamine | 107 | 0.11 |
| piperazine | 158 | 3.57 |
| 2-aminopyridine | 132 | 0.52 |
| N,N-dimethylaniline | 142 | 0.80 |

*Water has no buffering effect.

The results of the test, as shown in Table 1, demonstrate percent efficiency values ranging from 96 to 205 percent over water. Amines which provide percent efficiency values of at least 125 percent over water are preferred since they demonstrate a substantial enhancement in the absorption rate of sulfur dioxide. Although the amount of sulfur dioxide absorbed at an efficiency over water of 125 percent is actually less than the amount of sulfur dioxide absorbed by the adipic acid solution, the amines are nevertheless more desirable because of their increased solubility in water and low oxidative degradation potential as compared to adipic acid. Thus, more amine can typically be incorporated into the slurry than adipic acid due to the increased solubility of the amine. Table 1 illustrates that the amines which had a percent efficiency over water of at least 125 percent had an available alkalinity of at least about 2.2 meq/gram between a pH of 3.0 to 5.5.

We claim:

1. A process for removing sulfur dioxide from a gas stream comprising;
    (a) contacting a feed gas containing sulfur dioxide with an aqueous slurry comprising:
        (i) an absorbent selected from lime, limestone and mixtures thereof in an amount effective to obtain a loading of at least 0.8 gram of sulfur dioxide per gram of calcium in said slurry; and
        (ii) an additive comprising a polyamine in a partial salt form having an available alkalinity of at least about 0.5 meq/gram between a pH of 3.0 and 5.5, said polyamine being present in an amount of from about 100 to 5000 ppmw based on the total weight of the slurry;
    at conditions effective to absorb the sulfur dioxide from the feed gas, said conditions including a temperature of up to about 80° C. and a pH of less than 6.0;
    (b) withdrawing a gas product which is at least partially depleted in sulfur dioxide and which comprises water vapor; and
    (c) withdrawing a spent slurry comprising at least one of calcium sulfate or calcium sulfite.

2. The process of claim 1 wherein the polyamine has an available alkalinity of at least about 2.0 meg/gram between a pH of 3.0 and 5.5.

3. The process of claim 1 wherein the polyamine has an available alkalinity of at least about 4.0 meq/gram between a pH of 3.0 and 5.5.

4. The process of claim 1 wherein the polyamine has at least one amine group with a pKa of from about 3.0 to about 6.0.

5. The process of claim 4 wherein the polyamine has at least one other amine group with a pKa of at least about 6.0.

6. The process of claim 1 wherein the polyamine is substantially free of metals.

7. The process of claim 1 wherein the polyamine is selected from N,N-dimethylaniline, N,N',N'-(trimethyl)-N-(2-hydroxyethyl)-ethylenediamine, N,N,N',N'-tetramethyl-ethylenediamine, N,N,N',N'-tetramethyl-diaminomethane, N,N,N',N'-tetrakis-(2-hydroxyethyl)-ethylenediamine, N,N'-dimethylpiperazine, N,N,N',N'-tetrakis-(2-hydroxyethyl)-1,3-diaminopropane, N',N'-dimethyl-N, N-bis(2-hydroxyethyl)-ethylenediamine, N,N'-bis(2-hydroxyethyl)-piperazine, N-methyl-piperazine, piperazine, N-(2-hydroxyethyl)-piperazine, aminoethyl-piperazine, aminoethyl-ethanolamine, diethylenetriamine, triethylenetetramine, and mixtures thereof.

8. The process of claim 1 wherein the conditions effective to absorb sulfur dioxide include a temperature of from about 30° to 70° C.

9. The process of claim 1 wherein the polyamine is present in the slurry in an amount effective to enhance the absorption rate of sulfur dioxide.

10. The process of claim 1 which further comprises passing the spent slurry to a settling zone under conditions effective to promote the precipitation of calcium sulfate or calcium sulfite, or both, from the spent slurry.

11. The process of claim 10 wherein the conditions include a residence time of sufficient duration to substantially complete the precipitation of calcium sulfate or calcium sulfite, or both.

12. The process of claim 10 which further comprises withdrawing from the settling zone a solid product comprising water and calcium sulfate or calcium sulfite, or both, and a recycle stream comprising water and the polyamine.

13. The process of claim 12 which further comprises introducing the recycle stream to the absorption zone to comprise a portion of the aqueous slurry.

14. The process of claim 12 which further comprises:
    (a) contacting at least a portion of the solid product with a make-up water stream to desorb the polyamine from the solid product to provide a wash-water effluent stream comprising make-up water and the amine; and
    (b) introducing at least a portion of the wash-water effluent stream to the absorption zone to comprise a portion of the aqueous slurry.

15. The process of claim 14 wherein the rate of addition of the make-up water stream contacting the solid product does not exceed the sum of the rate of water withdrawn from the process with the solid product plus the gas product.

16. A process for removing sulfur dioxide from a gas stream comprising;
    (a) contacting a feed gas containing sulfur dioxide with an aqueous slurry comprising:
        (i) an absorbent selected from lime, limestone and mixtures thereof in an amount effective to obtain a loading of at least 0.8 gram of sulfur dioxide per gram of calcium in said slurry; and
        (ii) an additive comprising a polyamine in a partial salt form having an available alkalinity of at least about 0.5 meq/gram between a pH of 3.0 and 5.5, said polyamine being present in an amount of from about 100 to 5000 ppmw based on the total weight of the slurry;
    at conditions effective to absorb the sulfur dioxide from the feed gas, said conditions including a temperature of up to about 80° C. and a pH of less than 6.0;
    (b) withdrawing a gas product which is at least partially depleted in sulfur dioxide and which comprises water vapor;
    (c) withdrawing a spent slurry comprising at least one of calcium sulfate or calcium sulfite;
    (d) passing the spent slurry to a settling zone under conditions effective to promote the precipitation of calcium sulfate or calcium sulfite, or both, from the spent slurry;
    (e) withdrawing from the settling zone a solid product comprising water and calcium sulfate or calcium sulfite, or both, and a recycle stream comprising water and the polyamine;
    (f) introducing the recycle steam to the absorption zone to comprise a portion of the aqueous slurry;
    (g) contacting at least a portion of the solid product with a make-up water stream to desorb the polyamine from the solid product to provide a wash-water effluent stream comprising make-up water and the polyamine; and
    (h) introducing at least a portion of the wash-water effluent stream to the absorption zone to comprise a portion of the aqueous slurry.

17. The process of claim 16 wherein the rate of addition of the make-up water stream contacting the solid product does not exceed the sum of the rate of water withdrawn from the process with the solid product plus the gas product.

18. The process of claim 1 wherein contacting step (a) is conducted at a pH of from about 3.0 to 5.8.

19. The process of claim 18 wherein contacting step (a) is conducted at a pH of from about 4.5 to 5.5.

20. The process of claim 1 wherein the absorbent is limestone.

* * * * *